Aug. 2, 1932.  C. A. NICKLE  1,870,064
ELECTRICAL REGULATOR
Filed July 29, 1931
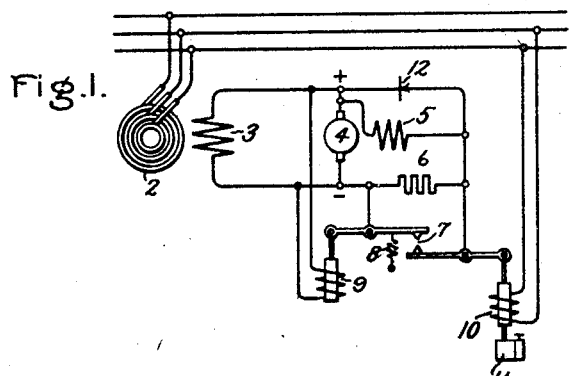
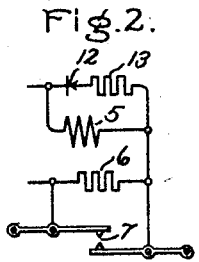
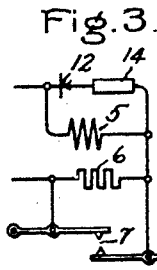
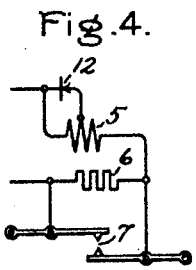
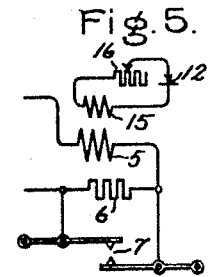
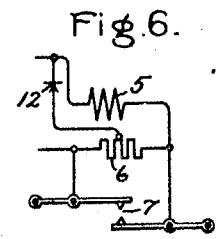
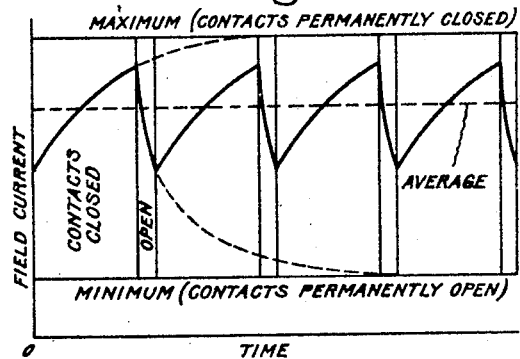
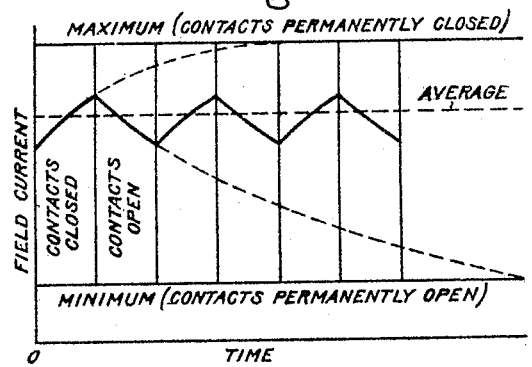
Inventor:
Clifford A. Nickle
by Charles E. Fuller
His Attorney, Patented Aug. 2, 1932

1,870,064

UNITED STATES PATENT OFFICE

CLIFFORD A. NICKLE, OF SCHENECTADY, NEW YORK, ASSIGNOR TO GENERAL ELECTRIC COMPANY, A CORPORATION OF NEW YORK

ELECTRICAL REGULATOR

Application filed July 29, 1931. Serial No. 553,805.

My invention relates to electrical regulators and more particularly to improvements in vibratory contact type electrical regulators which control the inductive field circuit of electrical machines.

Vibratory contact type regulators consist essentially of a pair of relatively vibratory contacts which operate to control the average value of current in a control circuit, by varying the period during which the contacts are respectively open and closed, in accordance with the value of a condition to be regulated. Usually, the control circuit is a highly inductive circuit, such as the field winding circuit of a dynamo electric machine, and the contacts instead of being connected directly in the control circuit are connected across a current limiting impedance which is usually referred to as a regulating resistance. When the contacts are closed the current builds up at a rate depending upon the constants of the circuit and the magnitude of the applied voltage and when the contacts are opened the current builds down at a different rate because of the addition of the resistance to the circuit.

Due to relatively high inductance of the control circuit relatively high voltages are produced at the contacts when they separate and this tends to produce damaging contact arcing. It is customary practice to interpose an intermediate relay between the main vibratory control contacts of the regulator and the regulating resistance and also to connect capacitors across the relay contacts, and also across the main contacts, so as to minimize contact sparking. The control circuit is also usually the field winding circuit of an exciter, which has a lower inductance than the field winding circuit of the main machine, so as to reduce the duty on the regulator contacts. It has been found, however, that in very large capacity machines the exciter field currents are of such large values that vibratory contact regulators have difficulty in handling them. Another reason for this difficulty is that the peak values of current in the regulated circuit are considerably above the average value of current in the regulated circuit. This in turn is due to the fact that the rates of build up and build down of current in the control, or regulated circuit, are not equal due to the changes of resistance in this circuit.

In accordance with my invention I provide extremely simple means in the form of an asymmetrical conducting device connected to the control, or regulated circuit, in such a manner as to reduce its effective inductance. Briefly stated, this asymmetrical conductor is connected in such a way as to provide a low resistance path for current produced by the inductive voltage of the circuit when its current starts to build down, due to the opening of the control contacts. This may be done in a number of ways, perhaps the simplest of which is to connect a half wave rectifier in parallel with the field winding in such a way that it carries no current when the current in the field winding is steady, or when it is increasing, but when the field current is decreasing the inductive voltage of the winding tending to maintain this current will cause a flow of current through the low resistance of the rectifier. The effect of such a connection is greatly to minimize contact arcing so that the usual contact condensers, or capacitors, may either be entirely omitted, or their capacities greatly reduced. This arrangement also tends to equalize the rate of build up and build down of current in the control circuit thereby to cause substantially equal periods during which the contacts are respectively opened and closed during normal operation of the regulator with the result that the speed of operation of the regulator is increased.

An object of my invention is to provide a new and improved vibratory contact type regulating arrangement.

Another object of my invention is to provide a vibratory contact type regulating arrangement for the field winding circuits of dynamo electric machines so that the rate of build up and build down of the field current are substantially equal.

Another object of my invention is to provide means for minimizing contact arcing of vibratory contact type regulators.

My invention will be better understood from the following description taken in connection with the accompanying drawing and its scope will be pointed out in the appended claims.

In the drawing, Fig. 1 illustrates a simplified diagrammatic view of an embodiment of my invention; Figs. 2, 3, 4, 5, and 6 illustrate respectively modifications of the arrangement illustrated in Fig. 1; Figs. 7 and 8 are comparative curves for illustrating the effect of my invention on the operation of a vibratory contact type regulator, and Fig. 9 is a set of curves for illustrating another effect of my invention on the operation of vibratory contact type regulators.

Referring now to Fig. 1, I have illustrated by way of example an application of my invention to a regulator 1 which is connected to regulate the voltage of an alternating current machine 2 having a field winding 3 which is connected to be energized from the armature 4 of an exciter having a shunt field winding 5. Machine 2 may be either an alternating current generator or an alternating current motor or synchronous condenser and it is immaterial to my invention whether regulator 1 regulates the voltage or any other operating condition of machine 2. Winding 5 is connected in series with a regulating resistance 6 and a pair of relatively vibratory contacts 7 are connected to periodically short circuit this resistance.

Regulator 1 may be any type of vibratory contact type regulator and as illustrated its main control contacts 7 are connected directly across resistance 6 so as to simplify the showing although it should be understood that in most actual installations the usual intermediate relay would be connected between these contacts and resistance 6. The contacts 7 are mounted on the usual pivotally mounted arms and are controlled respectively by an anti-hunting magnet 9, connected to respond to the exciter voltage, and a main control magnet 10, connected to respond to the voltage of machine 2. The usual spring 8 is provided to oppose the pull of magnet 9 and the usual damping dashpot 11 is connected to the core of magnet 10.

Connected in parallel with field winding 5 is an asymmetrical conductor, or half wave rectifier, 12. This rectifier, which may be of any well known construction, such for example as of the copper oxide type, is so connected as to prevent the flow of current therethrough from the exciter. This is shown by the relative polarity markings of th exciter armature and the direction of the arrow head in the rectifier, which may be taken as indicating the direction of conductivity of the rectifier. With this arrangement, when the current in field winding 5 is steady, or when it is increasing, the potential of its left-hand end will be above the potential of its right-hand end due to the voltage drop therein and consequently no current will flow in rectifier 12. However, when the current in field winding 5 is decreasing its inductance will tend to maintain this current with the result that its right-hand end becomes positive with respect to its left-hand end and consequently a current will flow through the low resistance conducting path of rectifier 12.

The operation of the ordinary voltage regulator of the vibratory contact type is well understood by those skilled in the art. Briefly stated, it is as follows: The upper contact 7 is known as the anti-hunting contact as its operation is controlled by anti-hunting magnet 9. This entire assembly, that is to say, upper contact 7, magnet 9 and spring 8 is in a state of unstable equilibrium and is continually vibrating at a rapid rate due to the fact that when the contacts 7 are engaged the field winding current is increased thereby to increase the voltage of exciter armature 4 and consequently the pull of magnet 9. The result is that magnet 9 overpowers spring 8 and separates the contacts. When this occurs the voltage of armature 4 falls and spring 8 overpowers magnet 9 causing engagement of the contacts. Magnet 10 is so designed that with normal voltage of machine 2 the lower contact 7 will be stationary while if the voltage falls the lower contact will rise and if the voltage increases above normal the lower contact will move downwardly. Consequently, if the voltage falls for example, the lower contact will move upwardly with the result that the upper contact will have to vibrate about a new normal position which is represented by an increase in exciter voltage which is sufficient to cause an increase in the excitation of the main machine of a value sufficient to restore the regulated voltage to normal. In a similar way, if the voltage in the main machine rises the lower contact will descend thereby causing the anti-hunting contact to vibrate about a new and lower normal position with the result that the excitation of the main machine is decreased.

In Fig. 7 the operation of the ordinary vibratory contact type regulator during steady state conditions is represented by means of a curve having exciter field current as ordinates and time as abscissæ. Thus, during the first interval of time, while the contacts of the regulator are closed, the exciter field current is building up on a definite curve whose shape is predetermined by the constants of the circuit and the voltage of the exciter. During the second interval of time, when the contacts 7 are open, the field current builds down at a very rapid rate due to the insertion of the regulating resistance 6 in series with the field winding. The intermittent opening and closing of the contacts 7 results in the saw-tooth shaped curve illustrated. The average value of this current is indicated by the dotted line.

If the contacts 7 were permanently closed the field current would finally attain a maximum value indicated by the upper horizontal line and if the contacts were permanently opened, the field current would attain a constant minimum value indicated by the lower horizontal line.

The effect of rectifier 12 on the shape of the current-time curve is illustrated in Fig. 8. As will be seen, the rates of current build up and current build down are now substantially equal so that for the same value of average current as in Fig. 7 the peak values of current are considerably less. The reason that the build down rate of the current is much lower in Fig. 8 than in Fig. 7 is because the rectifier 12 offers a low resistance path to the current produced by the inductive voltage of the field winding and consequently this current continues to flow for a considerable period of time in the winding 5 and through the rectifier 12.

Fig. 9 illustrates another effect of the use of rectifier 12. In this figure the solid curve shows field currents as ordinates plotted against kva. leading of machine 2 when it is operating over-excited as a synchronous condenser. The dashed curve represents the average current flow in the rectifier 12. As will be seen the difference in the ordinates of these two curves represents the current which is controlled by the regulator contacts. This current will be seen to be considerably less than the average field current which in the ordinary regulator is controlled by the contacts.

In the modification illustrated in Fig. 2 a resistance 13 is connected in series with rectifier 12. By adjusting the value of this resistance the build down rate of the exciter field winding current may be controlled. Thus for example, with a proper value of this resistance the build down rate may be made exactly equal to the build up rate of the field winding current. Such a connection is also of advantage in cases where the regulating resistance is in the form of a Wheatstone bridge. Such Wheatstone bridge type regulating resistances are sometimes employed when the regulated machine is a synchronous condenser for in such cases it is often desirable to produce very rapid changes in excitation of the main machine and this can be done very quickly with a Wheatstone bridge type regulating resistance because this bridge may be reversely unbalanced thereby momentarily reversing the potential of the exciter field winding. Without resistance 13 the rectifier 12 would act as a short-circuit about the field winding and would prevent such operation.

In the modification shown in Fig. 3 a non-linear volt-ampere characteristic impedance, or resistance element, 14 is connected in series with rectifier 12. It is sometimes desirable that the build down rate of field current should remain substantially independent of the exciter voltage. By providing a resistance, such as the element 14, which decreases in value with increases in applied voltage it is possible to obtain this result for at the higher ranges of exciter voltage, when the field winding current would naturally tend to build down at a greater rate, the resistance 14 would decrease in value thereby compensating for the increased voltage and acting to maintain the build down rate substantially constant. A suitable resistance material having such a volt-ampere characteristic is disclosed and claimed in Patent No. 1,822,742, issued September 8, 1931, on an application of K. B. McEachron, and assigned to the assignee of the present application.

In the modification shown in Fig. 4 the rectifier 12 is connected across but a part of field winding 5. This may sometimes be desirable when it is intended to modify the build down rate of the field current.

In Fig. 5 is shown an arrangement in which the rectifier 12 is inductively rather than conductively connected to field winding 5. As shown, this is done by means of a separate winding 15 which is inductively related to field winding 5. A variable resistance 16 is also connected in series with rectifier 12.

In Fig. 6 is shown a modification in which a part of the regulating resistance 6 is also included in the circuit of the rectifier 12. In this manner the desired build down characteristics of the field curent may be obtained without the use of a separate resistance in circuit with the rectifier.

While I have shown and described particular embodiments of my invention, it will be obvious to those skilled in the art that changes and modifications may be made without departing from my invention in its broader aspects, and I therefore aim in the appended claims to cover all such changes and modifications as fall within the true spirit and scope of my invention.

What I claim as new and desire to secure by Letters Patent of the United States, is:

1. In combination, an inductive winding, a pair of relatively vibratory contacts connected to caused periodic increases and decreases of the current in said winding, and an asymmetrical conductor connected to reduce the effective inductance of said winding.

2. In combination, an inductive winding, an impedance connected to control the current in said winding, a pair of contacts connected to control the effective value of said impedance, and an asymmetrical conductor connected to provide a relatively low impedance path for the build down current of said winding.

3. In combination, an inductive winding, an impedance connected to control the current in said windnig, a pair of contacts connected to control the effective value of said impedance, and an asymmetrical conductor connected to modify the rate of current build down in said winding with respect to the rate of current build up.

4. In combination, a dynamo electric machine field winding, a resistance in circuit therewith, a pair of relatively vibratory contacts for periodically short circuiting said resistance, and an asymmetrical conductor connected in parallel with said winding.

5. In combination, a dynamo electric machine field winding, a regulating resistance in series therewith, a pair of relatively vibratory contacts for periodically short circuiting said resistance, an asymmetrical conductor connected to by-pass the current which the inductance of said winding tends to maintain, and a resistance in series with said conductor.

6. In combination, a field winding for a dynamo electric machine, a regulating resistance in series with said field winding, a pair of relatively vibratory contacts for periodically short circuiting said resistance, an asymmetrical conductor connected across said winding in a manner to prevent a substantial increase in voltage across said winding when said contacts open, and a non-linear volt-ampere characteristic impedance connected to said asymmetrical conductor.

7. In combination, an exciter, a shunt connected field winding therefor, a regulating resistance in series with said winding, a pair of relatively vibratory contacts for periodically short circuiting said resistance, a half wave rectifier connected across said field winding in a manner to conduct current when said contacts are open, and a resistance whose value decreases with increases in applied voltage connected in series with said rectifier.

8. In combination, an exciter, a field winding therefor, a regulating resistance in circuit with said field winding, a vibratory contact regulator having contacts for periodically short circuiting said resistance, and a half wave copper oxide rectifier connected across said field winding, in a manner to reduce its effective inductance.

9. In combintion, a dynamo electric machine, a field winding therefor, an exciter for energizing said field winding, a field winding on said exciter, a vibratory contact type regulator for controlling the energization of said exciter field winding, and a half wave copper oxide rectifier connected across said exciter field winding in such a way as to limit the voltage induced in said exciter field winding when the contacts of said regulator open.

In witness whereof I have hereunto set my hand.

CLIFFORD A. NICKLE.